United States Patent
Liljestrom et al.

(10) Patent No.: US 10,284,345 B2
(45) Date of Patent: May 7, 2019

(54) CONTROLLING TRANSMISSIONS

(71) Applicant: Nokia Solutions and Networks Oy, Espoo (FI)

(72) Inventors: Henrik Christian Liljestrom, Helsinki (FI); Tuula-Mari Rautala, Espoo (FI); Pertlu Aukusti Mella, Lepsama (FI); Pekka Johannes Marjelund, Muijala (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/079,332

(22) Filed: Mar. 24, 2016

(65) Prior Publication Data
US 2016/0286446 A1    Sep. 29, 2016

(30) Foreign Application Priority Data
Mar. 26, 2015  (EP) .................................... 15161123

(51) Int. Cl.
| | | |
|---|---|---|
| *H04W 4/00* | (2018.01) | |
| *H04L 5/00* | (2006.01) | |
| *H04W 36/00* | (2009.01) | |
| *H04W 72/04* | (2009.01) | |
| *H04W 36/04* | (2009.01) | |
| *H04W 88/12* | (2009.01) | |
| *H04W 48/12* | (2009.01) | |

(52) U.S. Cl.
CPC .......... *H04L 5/0048* (2013.01); *H04L 5/0053* (2013.01); *H04W 36/0061* (2013.01); *H04W 72/042* (2013.01); *H04W 36/04* (2013.01); *H04W 48/12* (2013.01); *H04W 88/12* (2013.01)

(58) Field of Classification Search
None
See application file for complete search history.

(56) References Cited

U.S. PATENT DOCUMENTS

| | | | |
|---|---|---|---|
| 8,027,329 B2 * | 9/2011 | Hafeez | H04B 1/7077 370/328 |
| 2004/0259547 A1 * | 12/2004 | Lau | H04W 36/30 455/436 |
| 2005/0153695 A1 * | 7/2005 | Cho | H04W 36/0083 455/436 |
| 2006/0159016 A1 * | 7/2006 | Sagfors | H04L 47/12 370/230 |
| 2006/0166671 A1 * | 7/2006 | Rajkotia | H04W 36/32 455/436 |
| 2007/0149197 A1 * | 6/2007 | Lee | H04W 36/32 455/436 |
| 2007/0218913 A1 * | 9/2007 | Chen | H04W 72/10 455/450 |
| 2009/0098874 A1 * | 4/2009 | Goransson | H04W 36/0083 455/438 |
| 2009/0298502 A1 * | 12/2009 | Hagerman | H04W 36/30 455/436 |

(Continued)

*Primary Examiner* — Bob A Phunkulh
(74) *Attorney, Agent, or Firm* — Harrington & Smith (57) ABSTRACT

An apparatus and a apparatus method for controlling transmissions of base stations are proposed. In the method, the apparatus belongs to a set of apparatuses controlled by a common controller, transmits at least one control signal unique to the apparatus within a given area and transmits also a second control signal common to a set of apparatuses controlled by the same controller.

22 Claims, 3 Drawing Sheets

(56) References Cited

U.S. PATENT DOCUMENTS

| | | | |
|---|---|---|---|
| 2010/0197309 A1 | 8/2010 | Fang et al. .................... 455/436 |
| 2011/0159876 A1* | 6/2011 | Segall .................. H04W 64/00 |
| | | | 455/442 |
| 2012/0076018 A1 | 3/2012 | Singh et al. ................... 370/252 |
| 2012/0201319 A1* | 8/2012 | Asplund ............. H04B 7/0413 |
| | | | 375/267 |
| 2013/0235962 A1* | 9/2013 | O'Keefe ................ H01Q 3/267 |
| | | | 375/371 |
| 2014/0198655 A1 | 7/2014 | Ishii et al. .................... 370/235 |
| 2014/0204895 A1* | 7/2014 | Frederiksen ........ H04W 88/085 |
| | | | 370/329 |
| 2015/0156754 A1* | 6/2015 | Xu ...................... H04W 72/042 |
| | | | 370/329 |
| 2015/0382314 A1* | 12/2015 | Nammi ............... H04W 52/325 |
| | | | 370/338 |
| 2016/0135210 A1* | 5/2016 | Nammi ............. H04W 72/1231 |
| | | | 370/329 |
| 2016/0173175 A1* | 6/2016 | Tomeba ............... H04B 7/0417 |
| | | | 370/329 |
| 2016/0173251 A1* | 6/2016 | Nammi ................ H04W 48/12 |
| | | | 370/329 |
| 2016/0183111 A1* | 6/2016 | Nammi ................... H04B 7/04 |
| | | | 370/252 |

\* cited by examiner

CONTROLLING TRANSMISSIONS

TECHNICAL FIELD

The invention relates to communications.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

With the ever increasing demand for better capacity, increasing data rates and higher quality services in the world of mobile communications comes ever increasing demand for better performance of cellular network infrastructures. The available frequency resources are limited and need for efficient use of the resources is essential. The need for more efficient usage of radio resources has brought out an idea of increasing the number of cells available for mobile user terminal by employing small cells having coverage inside buildings. In large buildings there might be two to four base stations serving one floor. In large buildings having many floors this may lead into situations where there may be hundreds base stations in a relatively small geographical area. Outside the building(s) there may be a macro cell serving a large geographical area.

The above situation is challenging regarding handovers when user terminals are moving from the coverage area of the macro cell to the buildings which are served by a large number of base stations.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus comprising: at least one processor; and at least one memory including computer program code, the at least one memory and the computer program code configured to, with the at least one processor, cause the apparatus at feast to belong to a set of apparatuses controlled by a common controller; transmit at least one control signal unique to the apparatus within a given area; transmit a second control signal common to more than one base stations of the set of apparatuses controlled by the controller.

According to an aspect of the present invention, there is provided an apparatus comprising: at least one processor; and at least one memory including computer program code, the at least one memory and the computer program code configured to, with the at least one processor, cause the apparatus at least to: control the operation of a set of base stations; receive information regarding a user terminal requesting a handover on the basis of a control signal transmitted by more than one base stations belonging to the set of base stations; determine the base station to which the user terminal is to be handed over; control the handover of the user terminal to the determined base station.

According to an aspect of the present invention, there is provided a method comprising: belong to a set of apparatuses controlled by a common controller; transmitting at least one control signal unique to the apparatus within a given area; and transmitting a second control signal common to more than one base stations of the set of apparatuses controlled by the controller.

According to an aspect of the present invention, there is provided a method comprising: controlling the operation of a set of base stations; receiving information regarding a user terminal requesting a handover on the basis of a control signal transmitted by more than one base stations belonging to the set of base stations; determining the base station to which the user terminal is to be handed over; controlling the handover of the user terminal to the determined base station.

One or, more examples of implementations are set forth in more detail in the accompanying drawings and the description below. Other features will be apparent from the description and drawings, and from the claims.

BRIEF DESCRIPTION

In the following the invention will be described in greater detail by means of preferred embodiments with reference to the accompanying drawings, in which.

DETAILED DESCRIPTION OF SOME EMBODIMENTS

Embodiments are applicable to any base station, user terminal, network element, server, corresponding component, and/or to any communication system or any combination of different communication systems that sup-port required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN) or Wi-Fi based on IEEE 802.11 standard, worldwide interoperability for microwave ac-cess (WiMAX), Bluetooth®, personal communications services (PCS) and systems using ultra-wideband (UWB) technology. IEEE refers to the Institute of Electrical and Electronics Engineers.

Figure 1:
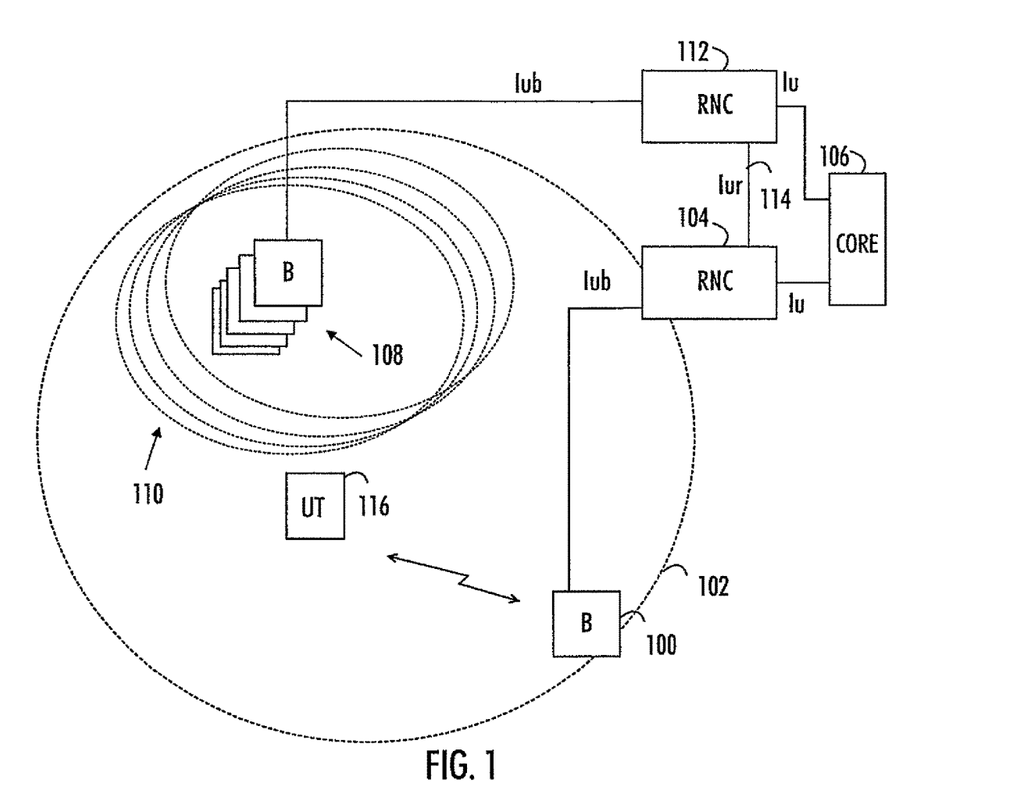
FIG. 1 illustrates a simplified example of a communication environment.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

Referring to FIG. 1, a radio system is described as an example of a system to which embodiments of the invention can be applied. The figure shows a base station or NodeB 100 serving a cell 102. The cell is geographically rather large, so-called Macro Cell. The Base Station 100 is connected via Iub interface to a Radio Network Controller RNC 104, which in turn is connected via Iu interface to Core Network 106.

The system further comprises a set of base stations 108 configured to serve relatively small coverage areas or cells 110. Typically the cells may be denoted as picocells and they may be utilised in situations where there is a large number of user terminals present and there is a need to reduce traffic load of the Macro Cell, for example. The base stations 108 serving small cells are connected via IUb interface to an RNC 112 which controls the base stations. RNCs 104 and 112 may be connected together via Iur interface 14.

Aspects and embodiments of the invention may be realised also in networks of other types as one skilled in the art is well aware. For example, solutions are also available where the same device functions both as the base station and RNC.

FIG. 1 further illustrates user terminal (UE) or user equipment (UT) 116 configured to communicate with a base station. User terminal may refer to a portable computing device. Such computing devices include wireless mobile communication devices operating with or without a subscriber identification module (SIM), including, but not limited to, the following types of devices: mobile phone, smartphone, personal digital assistant (PDA), tablet computer, laptop computer. User terminal is connected to the radio system via the base stations for providing the user of the user equipment with access to the core network of the telecommunications system.

In many systems the base stations may keep a list of nearby base stations which may be candidates for a user terminal for handover when the user terminal moves away from the base station. The list of handover candidates may be denoted as a neighbour list. In some systems the base stations transmit the neighbour list to the user terminals so that the terminals may more easily receive control channels sent by nearby base stations and thus detect the base stations and request a handover if the signal strength of the nearby base station exceeds a given limit.

One problem related to small cells is that in many systems there is a limit in the number of nearby base stations that may be stored in a neighbour list. For example, the number of neighbouring base stations that the Macro Cell base station 100 may store may be 32, for example. The numerical value is merely an example. If there is large buildings nearby in which the network coverage is arranged using many small cells, perhaps two to four cells per each floor, the number of base stations serving the small cells may easily be greater than the maximum number of base stations in a neighbouring list of the Macro Cell base station. This makes it difficult for a user terminal connected to the Macro Cell base station to perform handover optimally to a base station serving a small cell.

Figure 2:
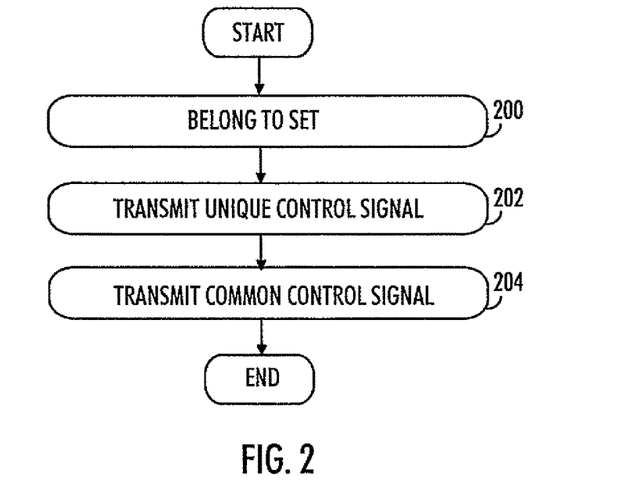
FIGS. 2 and 3 are flowcharts illustrating example embodiments of the invention.

FIG. 2 is a flowchart illustrating example embodiments of the operation of an apparatus. In the example of FIG. 2 the apparatus may be a base station 108 serving a small cell 110 or a part of a base station.

In step 200, the apparatus belongs to a set of apparatuses controlled by a common controller.

In step 202, the apparatus is configured to transmit at least one control signal unique to the apparatus within a given area. The control signal may be a pilot signal on the basis of which user terminals are able to identify the apparatus from other corresponding apparatuses.

In step 204, the apparatus is configured to transmit a second control signal common to a set of apparatuses controlled by the same controller.

In an embodiment, the control signal is a pilot signal such as Common Pilot Channel CPICH or Primary Common Pilot Channel P-CPICH. In an embodiment, each small cell 108 controlled by a small cell RNC 112 transmits the same P-CPICH.

In this way a dummy handover cell is created and is visible for user terminals. The cell can be considered as single big cell that enables the macro cell user terminal to make a handover to the small cells. The handover possibility may be limited to user terminals which are in CELL_DCH state where there is a dedicated physical channel allocated to the user terminal UE in both uplink and downlink direction. The dummy Cell P-CPICH may be sent from all antennas of each cell. In an embodiment, not all small cell base stations are included. For example, there more be more than one dummy cell in the area if need be.

In an embodiment, the small cell base station has received instructions from the controller controlling the base station to transmit one or more second control signals common to a set of apparatuses controlled by the same controller.

In an embodiment, the power allocated to the transmission of the control channels common to a set of apparatuses controlled by the same controller may be adjusted. Increasing the power used may be triggered by additional uncontrollable interference seen in uplink. The interference may imply that there exists macro user terminals close that that should be located in the small cell. By increasing the power used in the transmission of dummy Cell control channel one could trigger the user terminals to do a handover towards the small cell. And by lowering the transmission power one could move possible added dummy cell user terminals away from the dummy cell.

The macro cell may keep the dummy Cell P-CPICH in its neighbour list which it transmits to the user terminals.

In an embodiment, also other control channels common to a set of apparatuses controlled by the same controller may be sent. For example, Common Control Physical CHannel CCPCH or Primary Common Control Physical CHannel P-CCPCH and/or Synchronization Channel SCH may be sent by each small cell base station. The transmission of P-CCPCH and SCH may minimise the interoperability risks of legacy user terminals.

In an embodiment, the control signal unique to the apparatus and the control signal(s) common to a set of apparatuses are transmitted using different timing. If only P-CPICH would be sent as a common signal to all small cell base stations user terminals might not find this signal from a non-Cell DCH state if the timing of the P-CPICH is different to the small cell base station's own SCH channel. Transmission of additional P-CCPCH and possibly additional SCH would eliminate this potential issue.

When P-CCPCH is sent from a small cell base station in addition to cell's own corresponding signal, it may be required to force the user terminals from camping on the dummy handover cell. In an embodiment, the common P-CCPCH may indicate that that the dummy handover cell is barred.

In an embodiment, the control signals common to a set of apparatuses controlled by the same controller may be sent using different polarization than the control signals unique to the apparatus within a given area. As the control signals common to a set of apparatuses may not be orthogonal the control signals of the cell, the different polarization reduces interference. In an embodiment, the different polarization is achieved using Virtual Antenna Mapping VAM.

Figure 3:
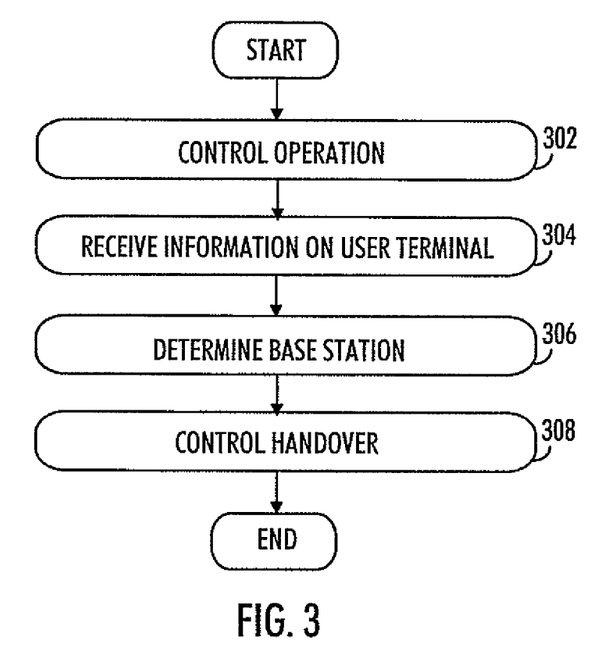

FIG. 3 is a flowchart illustrating example embodiments of the operation of an apparatus. In the example of FIG. 3 the apparatus may be an RNC 112 controlling base stations 108 serving small cells 110 or a part of an RNC.

In step 302, the apparatus is configured to control the operation of a set of base stations serving small cells.

In step 304, the apparatus is configured to receive information regarding a user terminal requesting a handover on the basis of a control signal transmitted by more than one base stations belonging to the set of base stations. In an embodiment, the information is received through Iur interface 114 from the RNC 104 serving a macro cell 102.

In step 306, the apparatus is configured to determine the base station to which the user terminal is to be handed over.

In an embodiment, the apparatus is configured to control the set of base stations 108 to measure signal transmitted by the user terminal; and determine the base station to which the user terminal is to be handed over on the basis of the measurements. The apparatus may, for example, request the base stations to perform radio link setup, which causes the base stations to measure the uplink scrambling code of the user terminal. The base station which found the user terminal is the target for handover.

In another embodiment, the apparatus is configured to receive from the user terminal information on the measurements the user terminal has made regarding the control signal transmitted by more than one base stations 108; and determine the base station to which the user terminal is to be handed over on the basis of the information.

In step 308, the apparatus is configured to control the handover of the user terminal to the determined base station.

As the same control signal is transmitted by many small cell base stations it may be challenging to detect in what small cell the user terminal is located as it is measuring a common P-CPICH from many antennas. By transmitting the common P-CPICH with different timing measuring Tm and OFF information element may be used to separate the dummy Cell transmissions from each other.

Thus, there are several different ways to detect the best small cell for the user terminal to handover to. First, RNC may request base stations to initiate radio link setup (RL setup) and the first one replying or the cell which radio measurements within a certain short time period are the best in the initial radio access is selected for handover and the other RL setups cancelled Second, a radio link verification message may be sent to a base station serving a small cell and by utilizing the timing information reported to the small cell RNC 112 the correct base station serving a small cell is selected for the RL setup. In an embodiment, some type of timing reference may be needed from the Macro RNC to help the small cell RNC in selecting the correct small cell. The timing reference may be provided with the Frame Protocol, for example.

Third, the small cell RNC may either directly reply to RL setup request with a neighbour cell list only or reply with a dummy RL setup response with a neighbour cell list. The neighbour cell list is updated to user terminal.

Figure 4A:
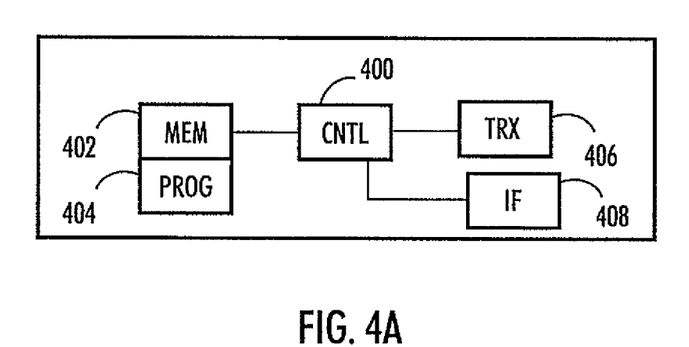
FIG. 4A, 4B and 5 illustrate simplified examples of apparatuses applying some embodiments of the invention.

FIG. 4A illustrates an embodiment. The figure illustrates a simplified example of an apparatus applying embodiments of the invention. In some embodiments, the apparatus may be an eNodeB or a base station or a part of an eNodeB or a base station of a communications system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 400 configured to control at least part of the operation of the apparatus.

The apparatus may comprise a memory 402 for storing data. Furthermore the memory may store software 404 executable by the control circuitry 400. The memory may be integrated in the control circuitry.

The apparatus comprises a transceiver 406. The transceiver is operationally connected to the control circuitry 400. It may be connected to an antenna arrangement (not shown).

The software 404 may comprise a computer program comprising program code means adapted to cause the control circuitry 400 of the apparatus at least to transmit at least one control signal unique to the apparatus within a given area and transmit a second control signal common to a set of apparatuses controlled by the same controller.

The apparatus may further comprise interface circuitry 408 configured to connect the apparatus to other devices and network elements of communication system, for example to core. The interface may provide a wired or wireless connection to the communication network. The apparatus may be in connection with Radio Network Controller RNC, core network elements, other eNodeB's, Home NodeB's and with other respective apparatuses of communication systems.

Figure 4B:
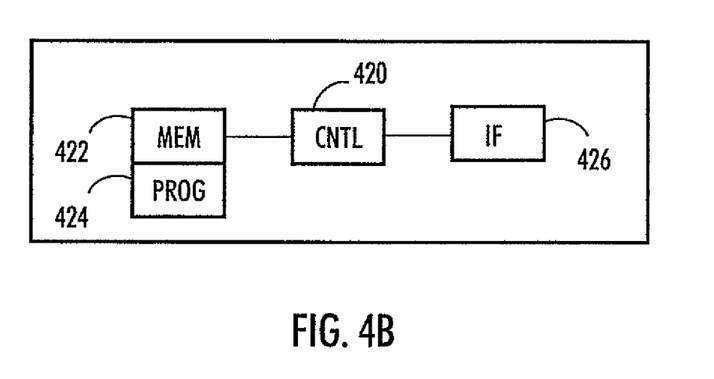

FIG. 4B illustrates an embodiment. The figure illustrates a simplified example of an apparatus applying embodiments of the invention. In some embodiments, the apparatus may be a Radio Network Controller RNC or a part of a Radio Network Controller of a communications system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 420 configured to control at least part of the operation of the apparatus.

The apparatus may comprise a memory 422 for storing data. Furthermore the memory may store software 424 executable by the control circuitry 400. The memory may be integrated in the control circuitry.

The software 424 may comprise a computer program comprising program code means adapted to cause the control circuitry 400 of the apparatus at least to control the operation of a set of base stations, receive information regarding a user terminal requesting a handover on the basis of a control signal transmitted by more than one base stations belonging to the set of base stations, determine the base station to which the user terminal is to be handed over, and control the handover of the user terminal to the determined base station.

The apparatus may further comprise interface circuitry 428 configured to connect the apparatus to other devices and network elements of communication system, for example to core. The interface may provide a wired or wireless connection to the communication network. The apparatus may be in connection with other Radio Network Controllers RNC, base stations, and core network elements and with other respective apparatuses of communication systems.

Figure 5:
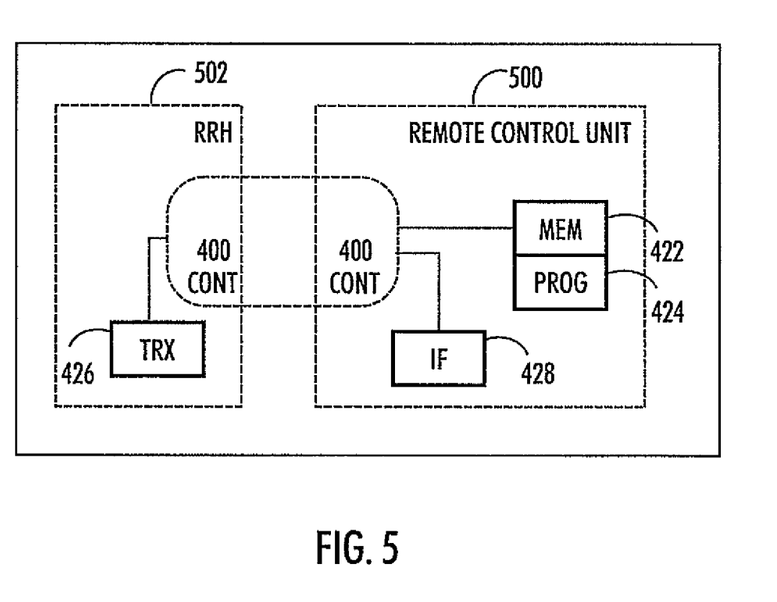

In an embodiment, as shown in FIG. 5, at least some of the functionalities of the apparatus of FIG. 4A may be shared between two physically separate devices, forming one operational entity. Therefore, the apparatus may be seen to depict the operational entity comprising one or more physically separate devices for executing at least some of the described processes. Thus, the apparatus of FIG. 5, utilizing such shared architecture, may comprise a remote control unit RCU 500, such as a host computer or a server computer, operatively coupled (e.g. via a wireless or wired network) to a remote radio head RRH 502 located in the base station. In an embodiment, at least some of the described processes may be performed by the RCU 500. In an embodiment, the execution of at least some of the described processes may be shared among the RRH 502 and the RCU 500.

In an embodiment, the RCU 500 may generate a virtual network through which the RCU 500 communicates with the RRH 502. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   at least one processor; and
   at least one memory including computer program code,
   the at least one memory and the computer program code configured to, with the at least one processor, cause the apparatus at least to:

transmit, from a first base station belonging to a set of base stations controlled by a common controller, at least one first control signal unique to the first base station within a given area, wherein each base station in the set corresponds to a different, separate cell, and wherein the at least one first control signal identifies the first base station from among the other base stations in the set of base stations; and transmit, from the first base station, at least one second control signal common to the first base station and at least one second base station of the set of base stations controlled by the common controller, wherein the at least one second control signal identifies a single dummy cell representing both the first base station and the at least one second base station.

2. The apparatus of claim 1, wherein the second control signal is a pilot signal.

3. The apparatus of claim 2, wherein the at least one memory and the computer program code are configured to, with the at least one processor, cause the apparatus, further to:

transmit a common control physical channel, wherein the pilot signal and the common control physical channel are both common to the set of bases stations controlled by the same common controller.

4. The apparatus of claim 3, the at least one memory and the computer program code configured to, with the at least one processor, cause the apparatus, further to:

transmit a synchronisation channel common to the set of base stations controlled by the same common controller.

5. The apparatus of claim 1, wherein the at least one memory and the computer program code are configured to, with the at least one processor, cause the apparatus, further to:

receive instructions from the common controller to transmit the at least one second control signal.

6. The apparatus of claim 1, wherein the at least one memory and the computer program code are configured to, with the at least one processor, cause the apparatus, further to:

transmit the at least one first control signal unique to the first base station and the at least one second control signal common to the first base station and the at least one second base station using at least one of different timing and different polarization.

7. The apparatus of claim 1, wherein each of the separate cells corresponds to a different small cell.

8. An apparatus comprising:
at least one processor; and
at least one memory including computer program code,
the at least one memory and the computer program code configured to, with the at least one processor, cause the apparatus at least to:
control the operation of a set of base stations;
transmit instructions to at least two base stations in the set of base stations, wherein the instructions instruct each of the at least two base stations to transmit at least one control signal that is common to the at least two base stations, wherein the at least one control signal identifies a single dummy cell representing the at least two base stations, and wherein each base station in the set corresponds to a different, separate cell;
receive information regarding a user terminal requesting a handover on the basis of the at least one control signal transmitted by the at least two base stations in the set of base stations;
determine the base station to which the user terminal is to be handed over from among the at least two base stations;
control the handover of the user terminal to the determined base station.

9. The apparatus of claim 8, the at least one memory and the computer program code configured to, with the at least one processor, cause the apparatus, further to:
control the set of base stations to measure signal transmitted by the user terminal; and
determine the base station to which the user terminal is to be handed over on the basis of the measurements.

10. The apparatus of claim 8, the at least one memory and the computer program code configured to, with the at least one processor, cause the apparatus, further to:
receive from the user terminal information on the measurements the user terminal has made regarding the control signal transmitted by the at least two base stations; and
determine the base station from among the at least two base stations to which the user terminal is to be handed over on the basis of the information.

11. The apparatus of claim 8, wherein each of the separate cells is a small cell, and wherein the user terminal is handed over from a macro base station corresponding to a macro cell to the determined base station.

12. A method, comprising
transmitting, from a first base station belonging to a set of base stations controlled by a common controller, at least one first control signal unique to the base station within a given area, wherein each base station in the set corresponds to a different, separate cell, and wherein the at least one first control signal identifies the first base station from among other base stations in the set of base stations; and
transmitting, from the first base station, at least one second control signal common to the first base station and at least one second base station of the set of base stations controlled by the common controller, wherein the at least one second control signal identifies a single dummy cell representing the first base station and the at least one second base station.

13. The method of claim 12, wherein the second control signal is a pilot signal.

14. The method of claim 13, further comprising:
transmitting a common control physical channel, wherein the pilot signal and the common control physical channel are both common to a set of base stations controlled by the common controller.

15. The method of claim 14, further comprising:
transmitting a synchronisation channel common to the set of base stations controlled by the common controller.

16. The method of claim 12, further comprising:
receiving instructions from the common controller to transmit the at least one second control signal.

17. The method of claim 12, further comprising:
transmitting the control signal unique to the first base station and the control signal common to the first base station and the at least one second base station using at least one of different timing and different polarization.

18. A computer program product embodied on a non-transitory distribution medium readable by a computer and comprising program instructions which, when loaded into an apparatus, execute the method according to claim 12.

19. A method comprising:
controlling the operation of a set of base stations;
transmitting instructions to at least two base stations in the set of base stations instructing each of the at least two base stations to transmit at least one control signal that is common to the at least two base stations, wherein the at least one control signal identifies a single dummy cell representing the at least two base stations, and wherein each base station in the set corresponds to a different, separate cell;
receiving information regarding a user terminal requesting a handover on the basis of the at least one control signal transmitted by the at least two base stations in the set of base stations;
determining the base station to which the user terminal is to be handed over from among the set of base stations; and
controlling the handover of the user terminal to the determined base station.

20. The method of claim 19, further comprising:
controlling the set of base stations to measure signal transmitted by the user terminal; and
determining the base station to which the user terminal is to be handed over on the basis of the measurements.

21. The method of claim 19, further comprising:
receiving from the user terminal information on the measurements the user terminal has made regarding the control signal transmitted by the at least two base stations; and
determining the base station from among the at least two base stations to which the user terminal is to be handed over on the basis of the information.

22. A computer program product embodied on a non-transitory distribution medium readable by a computer and comprising program instructions which, when loaded into an apparatus, execute the method according to claim 19.

* * * * *